US010664750B2

(12) United States Patent
Greene

(10) Patent No.: US 10,664,750 B2
(45) Date of Patent: May 26, 2020

(54) DEEP MACHINE LEARNING TO PREDICT AND PREVENT ADVERSE CONDITIONS AT STRUCTURAL ASSETS

(71) Applicant: Google Inc., Mountain View, CA (US)

(72) Inventor: Michael Greene, San Francisco, CA (US)

(73) Assignee: Google LLC, Mountain View, CA (US)

( * ) Notice: Subject to any disclaimer, the term of this patent is extended or adjusted under 35 U.S.C. 154(b) by 843 days.

(21) Appl. No.: 15/233,414

(22) Filed: Aug. 10, 2016

(65) Prior Publication Data

US 2018/0046910 A1 Feb. 15, 2018

(51) Int. Cl.
| | |
|---|---|
| *G06N 3/08* | (2006.01) |
| *G06N 3/02* | (2006.01) |
| *G06Q 10/06* | (2012.01) |
| *G06K 9/00* | (2006.01) |
| *G06N 5/02* | (2006.01) |

(52) U.S. Cl.
CPC .......... *G06N 3/08* (2013.01); *G06K 9/00791* (2013.01); *G06N 3/02* (2013.01); *G06N 5/022* (2013.01); *G06Q 10/06* (2013.01)

(58) Field of Classification Search
CPC ..................................................... G06N 3/08; G06N 3/02; G06N 5/022; G06N 20/00; G06K 9/00791; G06K 9/00657; G06Q 10/06
See application file for complete search history.

(56) References Cited

U.S. PATENT DOCUMENTS

| | | | |
|---|---|---|---|
| 7,046,841 B1 | 5/2006 | Dow et al. | |
| 7,474,964 B1 | 1/2009 | Welty et al. | |
| 7,809,587 B2 | 10/2010 | Dorai et al. | |
| 7,899,688 B2 | 3/2011 | Bonissone et al. | |
| 7,917,292 B1 | 3/2011 | Du | |
| | | (Continued) | |

FOREIGN PATENT DOCUMENTS

GB 2530104 3/2016

OTHER PUBLICATIONS

Deadman, P. J., Gimblett, H.R., "Applying Neural Networks to Vegetation Management Plan Development", 1997, AI Applications, vol. 11, Issue No. 3, Pertinent pp. 107-112 (Year: 1997).*

(Continued)

*Primary Examiner* — Alan Chen
*Assistant Examiner* — Urmana Islam
(74) *Attorney, Agent, or Firm* — Dority & Manning, P.A.

(57) ABSTRACT

The present disclosure provides systems and methods that use machine-learned models, such as deep neural networks, to predict and prevent adverse conditions at structural assets. One example method includes obtaining data descriptive of a plurality of images that depict at least a portion of a geographic area that contains a first structural asset. The plurality of images include at least a first image captured at a first time and a second image captured at a second time that is different than the first time. The method includes inputting data descriptive of at least the first image, the first time, the second image, and the second time into a condition prediction model. The method includes receiving, as an output of the condition prediction model, at least one prediction regarding the occurrence of an adverse condition at the first structural asset during one or more future time periods.

19 Claims, 6 Drawing Sheets

(56) References Cited

U.S. PATENT DOCUMENTS

| | | | |
|---|---|---|---|
| 8,352,410 | B2 | 1/2013 | Rousselle et al. |
| 8,374,431 | B2 | 2/2013 | Dow et al. |
| 8,423,548 | B1 | 4/2013 | Trandal et al. |
| 8,429,103 | B1 | 4/2013 | Aradhye et al. |
| 8,478,003 | B2 | 7/2013 | Rikimaru et al. |
| 8,651,206 | B2 | 2/2014 | Slawinski et al. |
| 8,655,595 | B1 | 2/2014 | Green et al. |
| 8,680,994 | B2 | 3/2014 | Leppanen et al. |
| 8,683,584 | B1 | 3/2014 | Daswani et al. |
| 8,706,659 | B1 | 4/2014 | Mann et al. |
| 8,724,900 | B2 | 5/2014 | Dow et al. |
| 8,756,085 | B1 | 6/2014 | Plummer et al. |
| 8,818,572 | B1 | 8/2014 | Tofte et al. |
| 8,872,818 | B2 | 10/2014 | Freeman et al. |
| 8,874,454 | B2 | 10/2014 | Plummer et al. |
| 9,002,719 | B2 | 4/2015 | Tofte |
| 9,069,104 | B2 | 6/2015 | Datta et al. |
| 9,082,015 | B2 | 7/2015 | Christopulos et al. |
| 9,171,341 | B1 | 10/2015 | Trandal et al. |
| 2004/0236611 | A1 | 11/2004 | Bonissone et al. |
| 2005/0203768 | A1 | 9/2005 | Florance et al. |
| 2006/0080212 | A1 | 4/2006 | Anderson et al. |
| 2010/0198775 | A1* | 8/2010 | Rousselle ............ A01B 79/005 706/54 |
| 2013/0073319 | A1 | 3/2013 | Du et al. |
| 2013/0197807 | A1 | 8/2013 | Du et al. |
| 2013/0289449 | A1 | 10/2013 | Stone et al. |
| 2014/0164264 | A1 | 6/2014 | Guttman et al. |
| 2014/0164306 | A1 | 6/2014 | Datta et al. |
| 2014/0200869 | A1 | 7/2014 | Hampapur et al. |
| 2014/0270494 | A1 | 9/2014 | Sawhney et al. |
| 2015/0012502 | A1 | 1/2015 | Sensharma |
| 2015/0019262 | A1 | 1/2015 | Du et al. |
| 2015/0213315 | A1 | 7/2015 | Gross |
| 2015/0235321 | A1 | 8/2015 | Unser et al. |
| 2015/0302529 | A1 | 10/2015 | Jagannathan |
| 2017/0032509 | A1* | 2/2017 | Mannar ...................... G06T 7/73 |
| 2017/0221110 | A1 | 8/2017 | Sullivan et al. |
| 2017/0277953 | A1* | 9/2017 | Stanley ............... G06K 9/00657 |
| 2018/0098137 | A1* | 4/2018 | Saha ......................... H04Q 9/00 |

OTHER PUBLICATIONS

Yella, Siril, Roger G. Nyberg, Barsam Payvar, Mark Dougherty, and Narendra K. Gupta. "Machine vision approach for automating vegetation detection on railway tracks." Journal of Intelligent Systems 22, No. 2 (2013): 179-196. (Year: 2013).*

International Search Report for PCT/US2017/041326 dated Oct. 30, 2017, 13 pages.

Kobayashi et al., "The Utilization of Satellite images to Identify Trees Endangering Transmission Lines", Institute of Electrical and Electronics Engineers Transactions on Power Delivery, vol. 24, No. 3, Jul. 2010, pp. 1703-1709.

Niska et al., "Neural Networks for the Prediction of Species-Specific Plot Volumes Using Airborne Laser Scanning and Aerial Photographs", Institute of Electrical and Electronics Engineers Transactions on Geoscience and Remote Sensing, vol. 48, No. 3, Mar. 2010, pp. 1076-1085.

Yang-cui et al., "Forecasting Relative Tree Growth Based on PPR Artificial Neural Network Model", $3^{rd}$ International Conference on Advanced Computer Theory and Engineering, Chengdu, China, Aug. 20-22, 2010, 4 pages.

The Written Opinion of the International Preliminary Examining Authority for PCT/US2017/041326 dated Jun. 28, 2016, 9 pages.

International Preliminary Report on Patentability for Application No. PCT/US2017/041326, dated Feb. 21, 2019, 9 pages.

Li e.t al., "Advances in Vegetation Management for Power Line Corridor Monitoring Using Aerial Remote Sensing Techniques", $1^{st}$ International Conference on Applied Robotics for the Power Industry, Montreal, Canada, Oct. 5-7, 2010, 6 pages.

Calandrelli, "Astro Digital Releases Platform for Anyone to Analyze Satellite Imagery", posted Feb. 24, 2016 https://techcrunch.com/2016/02/24/astro-digital-releases-platform-for-anyone-to-analyze-satellite-imagery/, retrieved Aug. 9, 2016, 9 pages.

Collins et al., "An Application of a Multiple Neural Network Learning System to Emulation of Mortgage Underwriting Judgements", IEEE International Conference on Neural Networks, Jul. 24-27, 1988, San Diego, California, pp. 459-466 vol. 2.

Crawford, "Leveraging Geospatial Big Data with Artificial Intelligence", www.diitalglobe.com/geobigdata, retrieved on Aug. 9, 2016, 11 pages.

DigitalGlobe, "Machine Learning Meets Geospatial Big Data", posted May 31, 2016, https://developer.digitalglobe.com/machine-learning-meets-geospatial-big-data/, retrieved on Aug. 9, 2016, 5 pages.

Orbital Insight, "A Macroscope for Understanding Earth", https://orbitalinsight.com, retrieved on Aug. 9, 2016, 9 pages.

* cited by examiner

DEEP MACHINE LEARNING TO PREDICT AND PREVENT ADVERSE CONDITIONS AT STRUCTURAL ASSETS

FIELD

The present disclosure relates generally to machine learning. More particularly, the present disclosure relates to systems and methods that use deep machine-learning to predict and prevent adverse conditions at structural assets.

BACKGROUND

An owner or manager of one or more structural assets often has a desire or requirement to monitor conditions at such structural assets. In particular, the owner or manager may have a desire or requirement to prevent adverse conditions at such structural assets.

As one example, a utility company may have a desire or requirement to prevent vegetation from growing on or otherwise encroaching on utility infrastructure such as utility poles and/or utility wires. As other vegetation-based examples, railways may be legally required to keep a specified buffer zone between rail tracks and vegetation; city governments may need to keep sidewalks clear of overhanging tree branches; and transit authorities may need to ensure overhead clearance for transit vehicles relative to tree branches or other vegetation. As additional examples, the owner or manager of building assets (e.g., residential homes, factories, office buildings, etc.) or infrastructure (e.g., bridges, roads, etc.) may desire to prevent structural failure, damage to the asset, or other adverse conditions at the building assets or infrastructure.

Monitoring of conditions at a significant volume of structural assets presents a number of challenges, including, for example, the operational cost associated with manual assessment of conditions at each individual asset. Such operational costs are particularly acute if monitoring must be performed at a relatively high frequency. For example, in the case of utility infrastructure, a utility company is typically required to perform regular (e.g., annual) inspection visits by a special-purpose survey crews (e.g., "scouting") of millions of miles of utility infrastructure to identify sites where encroachment is occurring (or likely to occur in the near future). As a consequence of such challenges, performance today is relatively poor. For example, some sources estimate that the majority of unplanned power outage minutes are due to vegetation issues. Thus, the occurrence of adverse conditions at structural assets such as utility infrastructure causes a significant societal and monetary cost.

SUMMARY

Aspects and advantages of embodiments of the present disclosure will be set forth in part in the following description, or can be learned from the description, or can be learned through practice of the embodiments.

One example aspect of the present disclosure is directed to a computing system to predict and prevent instances of vegetative overgrowth on utility infrastructure. The computing system includes at least one processor and at least one tangible, non-transitory computer-readable medium that stores instructions that, when executed by the at least one processor, cause the computing system to perform operations. Execution of the instructions causes the computing system to obtain data descriptive of a plurality of images that depict at least a portion of a geographic area that contains a first utility asset, the plurality of images includes at least a first image and a second image, the first image and the second image being different from each other in at least one of the following attributes: time of capture, location of capture, angle of capture, data type, and resolution. Execution of the instructions causes the computing system to input data descriptive of at least the first image and the second image into a machine-learned vegetation overgrowth prediction model that includes at least one neural network. Execution of the instructions causes the computing system to receive, as an output of the vegetative overgrowth prediction model, at least one prediction regarding the occurrence of a vegetative overgrowth condition at the first utility asset during one or more future time periods.

Another example aspect of the present disclosure is directed to a computer-implemented method to predict and prevent adverse conditions at structural assets. The method includes obtaining, by one or more computing devices, data descriptive of a plurality of images that depict at least a portion of a geographic area that contains a first structural asset. The plurality of images respectively depict the geographic area at a plurality of different times. The plurality of images include at least a first image captured at a first time and a second image captured at a second time that is different than the first time. The method includes inputting, by the one or more computing devices, data descriptive of at least the first image, the first time, the second image, and the second time into a condition prediction model. The condition prediction model includes at least one machine-learned neural network. The method includes receiving, by the one or more computing devices as an output of the condition prediction model, at least one prediction regarding the occurrence of an adverse condition at the first structural asset during one or more future time periods.

Another example aspect of the present disclosure is directed to a system to predict and prevent adverse conditions at structural assets. The system includes an image database that stores a plurality of images of geographic areas. The plurality of images includes at least a first ground-level image that depicts at least a portion of a first geographic area that contains a first structural asset. The plurality of images further include at least a first overhead image that depicts at least a portion of the first geographic area that contains the first structural asset. The system includes a machine learning computing system. The machine learning computing system includes at least one processor and at least one memory that stores a condition prediction model usable to predict the occurrence of adverse conditions at structural assets during one or more future time periods based on input imagery. The condition prediction model includes at least one machine-learned neural network. The machine learning computing system is operable to obtain the first ground-level image of the first geographic area. The machine learning computing system is operable to obtain the first overhead image of the first geographic area. The machine learning computing system is operable to input data descriptive of at least the first ground-level image and the first overhead image into the condition prediction model. The machine learning computing system is operable to receive at least one prediction regarding the occurrence of an adverse condition at the first structural asset as an output of the condition prediction model.

Other aspects of the present disclosure are directed to various systems, apparatuses, non-transitory computer-readable media, methods, and electronic devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which.

DETAILED DESCRIPTION

Figure 1:
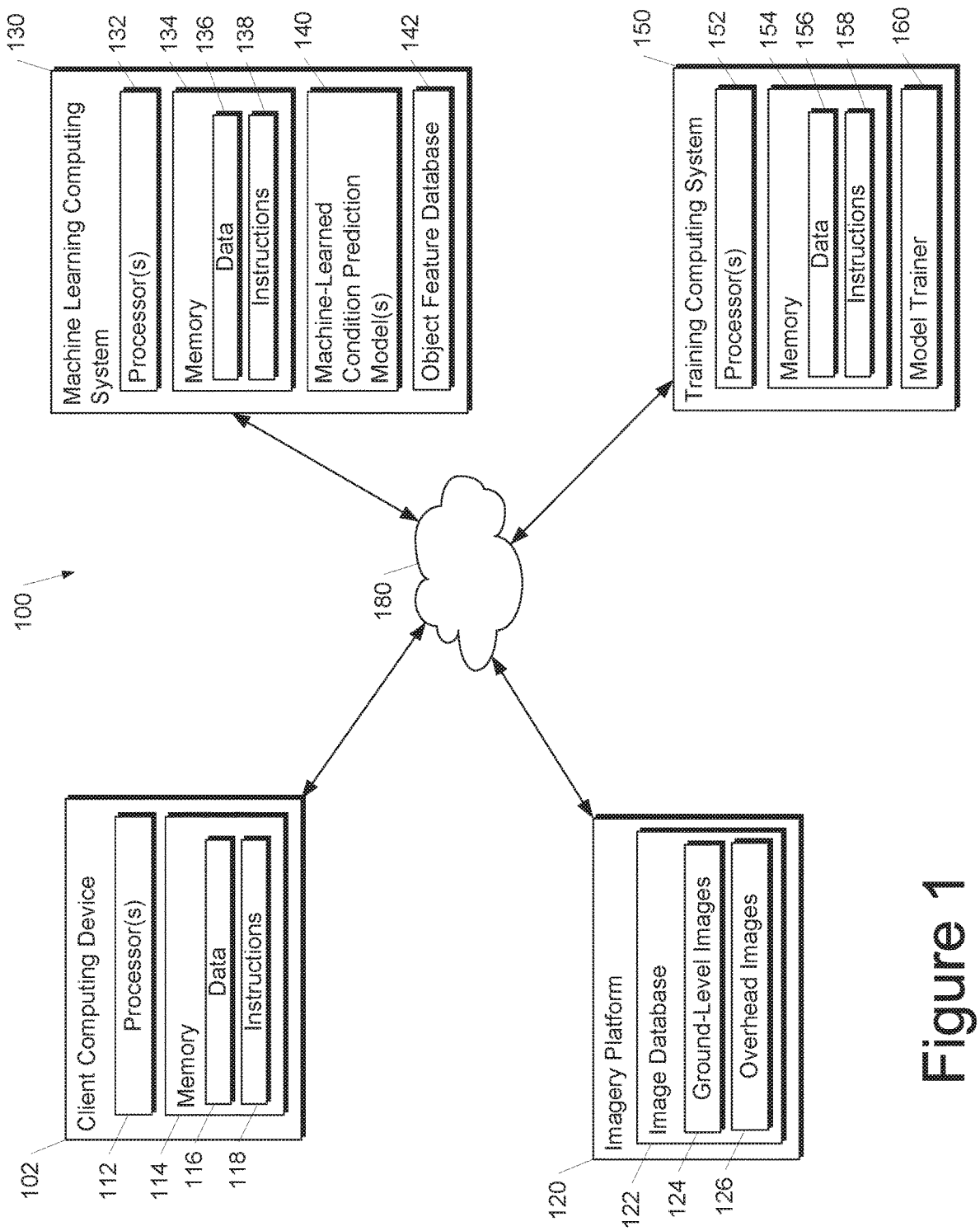
FIG. 1 depicts an example computing system to predict and prevent adverse conditions at structural assets according to example embodiments of the present disclosure.

The present disclosure provides systems and methods that predict and prevent adverse conditions at structural assets. As an example, the systems and methods of the present disclosure can predict and prevent vegetative overgrowth conditions at utility assets such as electric power poles and lines. In particular, the systems and methods of the present disclosure leverage machine-learned models such as neural networks (e.g., deep neural networks) to predict existing and/or future instances of adverse conditions based on imagery that depicts the structural assets. One example system of the present disclosure includes a condition prediction model that receives imagery of a first structural asset as inputs and then outputs at least one prediction regarding the occurrence of an adverse condition at the first structural asset. For example, the input imagery can include both one or more ground-level images of the first structural asset and one or more overhead images of the first structural asset. The at least one prediction can indicate the current existence of the adverse condition or can make a number of predictions regarding the probability, timing, and/or cost of the occurrence of an adverse condition that is predicted to occur during a future time period. Thus, the systems and methods of the present disclosure can enable a user to leverage machine-learned models to obtain predictions which enable the user to monitor and prevent adverse conditions at one or more structural assets.

More particularly, one example system according to the present disclosure includes a machine learning computing system and an imagery platform. The imagery platform can include an accessible image database that stores imagery of geographic areas that contain structural assets. For example, the image database can store ground-level images (e.g., street-level panoramic images, sets of light detection and ranging (LIDAR) data, user-submitted photographs, or other imagery at or near the level of the ground) as well as overhead images (e.g., overhead images captured by satellites and/or aircraft). The images can be optical images, infrared images, LIDAR data images, hyperspectral images, or any other type of imagery.

The machine learning computing system can store or otherwise include one or more machine-learned condition prediction models. For example, the condition prediction models can be or can otherwise include various machine-learned models such as neural networks (e.g., deep neural networks) or other multi-layer non-linear models. The machine learning computing system can access images from the imagery platform that depict a first structural asset. The machine learning computing system can use one or more condition prediction models to make predictions regarding the present and/or future occurrence of one or more adverse conditions at the first structural asset based on the obtained images. For example, the machine learning computing system can input the obtained images into one or more condition prediction models to receive one or more predictions by the one or more models regarding the occurrence of the one or more adverse conditions at the first structural asset.

In addition, in some implementations, the systems of the present disclosure can further include or otherwise communicate with a client computing device. The client computing device can receive user input or instructions that identifies the first structural asset and, in some instances, the adverse condition. In response to receipt of the user input, the client computing device can request or otherwise cause the machine learning computing system to obtain imagery that depicts the first structural asset from the image database and input the retrieved imagery into the condition prediction model to obtain predictions regarding conditions at the first structural asset. In other implementations, the client computing device can obtain the imagery from the imagery platform and then provide it to the machine learning system. For example, the obtained imagery can be selected by the user of the client computing device or can otherwise be identified based on user input. Thus, the client computing device can make use of the machine learning platform as a service for predictive purposes, which may in some instances be referred to as "machine learning as a service."

As an example, in some implementations, the prediction(s) output by the condition prediction model(s) can include a single prediction regarding the current existence of an adverse condition at the structural asset depicted by the input imagery. In some implementations, such single prediction can be accompanied by a confidence score that describes a confidence or probability that the input imagery depicts the current existence of the adverse condition.

As another example, in some implementations, the prediction(s) output by the condition prediction model(s) can include at least one prediction regarding the occurrence of the adverse condition at the structural asset during one or more future time periods. Thus, the condition prediction model(s) can predict not just a probability of the adverse condition currently existing, but can further predict the likelihood or probability of the adverse condition occurring during a number of future time periods. For example, in some implementations, the condition prediction model can output a plurality of confidence scores that respectively describe a confidence that the adverse condition will respectively occur at the structural asset during the plurality of future time periods. Thus, for example, the condition prediction model can provide a plurality of probabilities for respective instances of likely future encroachment over a plurality of specified future time periods.

As will be discussed further below, in some implementations in which the condition prediction model provides predictions regarding the future occurrence of adverse conditions, such condition prediction model can be trained on a set of training data that includes a plurality of training examples, where each training example includes a time series of imagery depicting a location and provides information sufficient to determine, for each image in the time series of imagery, an amount of time until a known instance of occurrence of the adverse condition at the location depicted by such image. Thus, for example, the condition prediction model can be trained on training examples that each include a series of images, where an amount of time until occurrence of the adverse condition is provided for each image in the series. Such training examples can enable the condition prediction model to learn to predict a time remaining until occurrence of adverse condition based on imagery that does not yet depict an adverse condition. However, images that do, in fact, depict the occurrence of the adverse condition can be included in the training set as well.

Furthermore, in some implementations in which the condition prediction model is used to provide predictions regarding the future occurrence of adverse conditions, the imagery that is input into such model to receive predictions can be accompanied by information sufficient to determine a time (e.g., date) at which each of such input images were captured. As one example, one or more images and one or more respective times at which such images were respectively captured can be input into the condition prediction model. Inclusion of input information regarding the time of capture of images can enable the condition prediction model to more accurately and precisely predict when a projected future occurrence of the adverse condition may likely occur. In some implementations, the time of capture information may simply indicate an amount of time that elapsed between each respective pair of sequential images in a time-sequence of imagery and an amount of time that has elapsed since the most recent of such images (e.g., rather than specifying a particular objective time or date of capture).

As yet another example, in some implementations, the prediction(s) output by the condition prediction model(s) can include one or more predictions regarding a cost of the occurrence of an adverse condition that is predicted to occur during a current time period and/or one or more future time periods. Thus, in some implementations, the condition prediction model can make predictions regarding not only the fact of concern (e.g., that an adverse condition is about to occur), but can additionally and/or alternatively provide predictions regarding a magnitude of concern, as measured by some metric. For example, the predictions can include predictions expressed in terms of dollars; expressed in terms of one or more reliability indices for utilities, such as the Customer Average Interruption Duration Index (CAIDI), the System Average Interruption Duration Index (SAIDI), the System Average Interruption Frequency Index (SAIFI), the Customer Average Interruption Frequency Index (CAIFI), the Customer Interrupted per Interruption Index (CIII), the Momentary Average Interruption Frequency Index (MAIFI), and/or the Average Service Availability Index (ASAI); expressed in terms of Occupational Safety and Health Administration (OSHA) reportable instances; expressed in terms of regulatory compliance requirements/costs; and/or expressed in terms of any other metric, including, for example, a custom defined metric. One example custom defined metric can provide a dollar cost per minute outage or downtime of the structural asset (e.g., per minute at which the adverse condition exists).

Such predictions that provide a magnitude of concern regarding the occurrence of the adverse condition can be provided for a current time period and/or one or more future time periods. Further, in various implementations, the condition prediction model can predict a single cost (e.g., a single prediction regarding a direct cost metric such as dollars or other metric for each time period for which a prediction is provided) or can provide a plurality of probabilities that the cost of the adverse condition will fall into certain cost ranges (e.g., a "histogram of cost" for each predicted time period). Likewise, condition prediction models which provide such metric-based predictions can be trained on training data that includes examples of imagery labelled with known outcomes expressed according to the desired metric, for example, based on historical data regarding costs resulting from the adverse condition, as expressed in terms of the desired metric.

Furthermore, in some implementations, the systems of the present disclosure can further include or otherwise communicate with a training computing system. The training computing system can be separate from the machine learning computing system or can be a portion of the machine learning computing system. The training computing system can include a model trainer that trains the machine-learned models stored at the machine learning computing system using various training or learning techniques, such as, for example, backwards propagation. In particular, the model trainer can train a condition prediction model based on a set of training examples. In some implementations, the training examples can be provided or otherwise selected by the client computing device (e.g., from the imagery platform).

In some implementations, the machine-learned model can be trained based on imagery that depicts known instances of an adverse condition. For example, known instances of the adverse condition can correspond to historical and/or expert-identified instances of actual harm or compliance violation.

Further, as discussed above, in some implementations, the training data can include a time series of imagery depicting a location, with each training example providing information sufficient to determine, for each image in the time series of imagery, an amount of time until a known instance of occurrence of the adverse condition at the location depicted by such image. Thus, aspects of the present disclosure can leverage back-dated imagery. As one example, an example image that was captured in May 2016 and which depicts a location at which an adverse condition occurred in June 2016 can be labeled with such respective dates of capture and adverse condition occurrence. Use of such training labels can indicate that the image depicts a location at which the adverse condition did not exist at the time of image capture but which experienced the adverse condition at a defined period of time thereafter. Training examples labeled in such fashion can enable the condition prediction model to learn to predict a time remaining until occurrence of adverse condition based on imagery that does not yet depict an adverse condition.

Likewise, as discussed above, the training data can be additionally and/or alternatively be labelled according to a number of different metrics, including fact of concern metrics (e.g., occurrence of the adverse condition) and/or magnitude of concern metrics (e.g., dollar cost or some other metric predicted to result from a predicted occurrence of the adverse condition).

Thus, the imagery platform, the training computing system, and the machine learning computing system may cooperatively operate to enable the user to select portions of imagery, instruct training of a model based on the selected training imagery, select additional imagery, and then instruct use of the trained model to receive predictions regarding structural assets depicted by the additionally selected imagery.

The user can use the predictions to better monitor and prevent the adverse conditions at the structural assets. For example, identified instances of adverse conditions can be resolved. Likewise, instances of adverse conditions that are predicted to occur in the near future can be resolved prior to occurrence, thereby reducing damage or compliance violations and associated costs.

In particular, as an example, the predictions can be used to assist in prioritizing maintenance tasks. For example, if an adverse condition is predicted to occur at a first structural asset prior to and/or with greater likelihood than occurring at a second structural asset, then resources that are limited can be deployed to maintain or otherwise prevent the adverse condition at the first structural asset in favor of the second structural asset. As an example, predictions regarding instances of vegetative overgrowth conditions at utility assets can be used to generate or otherwise inform maintenance crew (e.g., tree trimmers) target areas and/or schedules. In addition, predictions can also be used to establish compliance and/or assess an aggregate overall risk (e.g., either generally or associated with specific scenarios such as, for example, severe storms).

As noted above, in one example application of the above described principles the systems and methods of the present disclosure can be used to predict and prevent instances of vegetative overgrowth on utility assets. In particular, high-resolution imagery (e.g., ground-level imagery such as photographic imagery, LIDAR data, or other imagery) can be collected that depicts vegetation in relevant geographic areas in which utility assets are located. As described above, a deep neural network or other machine-learned condition prediction model can be trained to detect instances of existing encroachment and/or predict instances of likely future encroachment (e.g., over one or more specified future time periods). For example, the model can be trained using images known to be associated with vegetative overgrowth (e.g., due to historical incident data and/or based on manual review of imagery by human experts).

The technique described immediately above presents a dramatic cost/efficiency improvement over a traditional field survey approach to determining vegetative overgrowth/encroachment, as an expert field visit (e.g., a tree trimming scouting crew) can be replaced by an imagery collection trip (e.g., an image collection vehicle), and the latter may also serve multiple purposes. Likewise, use an image collection vehicle may correspond to a dramatically lower cost relative to image collection via satellite flyover. Furthermore, it should be appreciated that the above described technique can easily be expanded or otherwise adapted to detect and/or predict instances of other adverse conditions from imagery, in addition or alternatively to vegetative overgrowth conditions, which is provided as one example implementation only. As such, any discussion provided herein with regard to use of aspects of the present disclosure for the purpose of preventing vegetative overgrowth conditions is equally applicable to use of condition prediction models to predict and prevent other adverse conditions.

In some instances, however, use of the above described systems to continuously monitor or otherwise frequently predict instances of adverse conditions can have very high requirements for input data. As an example, the user may desire or be required to monitor a significant number or volume of structural assets. For example, all of the infrastructure (such as poles, wiring, transformers, etc.) for a utility company may cover many miles of geography. As another example, the objects or other factors which cause the monitored adverse condition may be rapidly changing, at least relative to the rate at which new imagery is acquired or otherwise made available. For example, in the case of a vegetative overgrowth condition, trees or other plants may grow more quickly than high-resolution imagery of the corresponding geographic area is typically acquired.

Thus, in some instances, to continuously monitor or otherwise frequently predict instances of adverse conditions, the input imagery must be both quite high-resolution (e.g., of sufficient resolution to usefully depict features of individual objects such as, for example, individual branches, leaves, and or shoots of trees or other plants) and quite frequent (e.g., of sufficient frequency to allow determination of the adverse condition according to an appropriate period at which conditions associated with the adverse condition change, such as, for the example of vegetative overgrowth, daily, weekly, and/or monthly periods).

However, the above discussed requirements of high-resolution and high frequency are typically not met by a single type of imagery. For example, traditional remote sensing via imagery is typically optimized for either resolution or frequency, but not both. As an example, ground-level imagery, such as, for example, LIDAR data is typically high-resolution, but is acquired at a relatively low frequency due to the cost of sending an imaging system to all locations to acquire the imagery. Likewise, overhead imagery, such as, for example, satellite or aircraft (e.g., airplane or drone) imagery can be acquired at a relatively higher frequency, but typically does not provide sufficient resolution to identify detailed features of individual structural assets or surrounding objects such as, for example, tree branches.

As such, according to an aspect of the present disclosure, some example systems and methods described herein combine frequent-but-lower-resolution imagery with infrequent-but-higher-resolution imagery. Such combination technique can result in improved system prediction performance and/or dramatic reductions in the cost of imagery collection.

Thus, in some implementations, relatively higher-resolution ground-level images that are collected, for example, once every few years (and which may be of sufficient resolution to indicate more detailed conditions such as, for example, tree locations, orientations, sizes, species, or other attributes) can be combined with relatively lower-resolution overhead imagery that is collected, for example, monthly (and which may be of sufficient resolution to indicate less detailed conditions such as general rates of vegetation growth).

As one example, in some implementations, both of a recent ground-level image and a recent overhead image can be input into one of the various condition prediction models described herein. For example, the recent ground-level image and the recent overhead image can be concatenated into a single concatenated image that is input into the condition prediction model. For example, the recent images can be the most recent images of their respective type. In some instances, various types of image preprocessing such as, for example, cropping, cloud/fog/haze removal, centering, or other image processing techniques can be performed prior to concatenation and/or entry of the images into the model. For example, either or both of the images can be centered about a particular structural asset and/or object near to the structural asset that may influence an adverse condition at the structural asset (e.g., a particular tree that may cause a vegetative overgrowth condition). Thus, in such example, a condition prediction model can make predictions based on a higher-resolution ground-level image (which is collected less frequently) in combination with a relatively lower-resolution overhead image (which is collected more frequently).

However, the above example of ground-level and overhead imagery is provided as one example only. Aspects of the present disclosure can be applied to any scenario in which higher-quality-but-lower-frequency imagery and lower-quality-but-higher-frequency imagery are both available. More particularly, higher-quality-but-lower-frequency imagery does not exclusively correspond to ground-level imagery. For example, high-resolution overhead imagery can be collected (e.g., infrequently collected) using low-flying aircraft (e.g., airplanes or drones). Likewise, in contrast to the example provided above, lower-quality-but-higher-frequency imagery does not necessarily correspond to overhead imagery. For example, user-generated imagery (e.g., photographs) or other lower-quality imagery could satisfy this description. In addition, although the resolution of an image does impact its quality, the quality of an image includes a number of other considerations in addition to resolution. For example, the quality of an image can also refer to or otherwise depend upon an image's position, pose, or other attributes (e.g., as impacting the ability to use the image to build and/or employ a condition prediction model). Thus, according to aspects of the present disclosure, a condition prediction model can be built from and draw upon the combination of higher-quality-but-lower-frequency imagery and lower-quality-but-higher-frequency imagery, which in some example instances may take the form of a higher-resolution ground-level image (which is collected less frequently) in combination with a relatively lower-resolution overhead image (which is collected more frequently).

According to another aspect of the present disclosure, in some implementations, the condition prediction model can include a machine-learned object detection model. The object detection model can receive one or more input images and, in response, detect one or more individual objects depicted by the images. In particular, the object detection model can output one or more object feature vectors that respectively describe one or more attributes of one or more respective objects included in a geographic area depicted by the input imagery.

The one or more of the object feature vectors (or other object attribute data representations) can then be provided to a downstream model (e.g., a downstream condition prediction neural network included in the condition prediction model) for use in generating a prediction regarding the occurrence of the adverse condition. For example, the object feature vectors can be generated from one or more ground-level images and can then be input into the condition prediction neural network along with one or more overhead images and/or the one or more ground-level images. The one or more overhead images and/or the one or more ground-level images input along with the object feature vector(s) can be centered about a particular object described by the input object feature vector(s).

In some implementations, in addition or alternatively to input of the object feature vectors into a downstream model, the object feature vectors can be used to build or supplement an object feature database that contains information about various attributes of objects in geographic areas surrounding structural assets to be monitored.

In one example application of the principles described above, the object detection model can be a plant detection model that receives input imagery (e.g., ground-level image(s)) and outputs one or more plant feature vectors that respectively describe attributes (e.g., locations, orientations, sizes, species, or other attributes) of one or more plants such as trees that are depicted by the imagery. In particular, the plant feature vectors can be used to build a plant database that contains information about the attributes of plants detected in geographic areas that contain utility assets. Information from the plant database (e.g., one or more plant feature vectors) can be input (e.g., along with imagery) into a machine-learned vegetation overgrowth neural network to receive prediction(s) regarding the occurrence of a vegetative overgrowth condition at the plants described by the input feature vectors.

As other examples, in addition or alternatively to a plant database, aspects of the present disclosure can be employed to build a span database that contains information about the location and/or other attributes of a number of spans of wire between adjacent utility poles. In such example, risk can optionally be estimated for each span holistically without attempting to explicitly locate and enumerate all surrounding plants. As another example, a geographic cell database can be built and/or used. For example, a power grid can be divided into a series of cells (e.g., 50 meter squares) and the system can directly estimate the risk of an overgrowth occurring in each cell. For example, in some instances, the risk for a particular cell can be based at least in part on a number of images which depict the geographic region that corresponds to such cell and which depict both a tree and a powerline. As yet another example, a feeder database can be built and/or used. A feeder is typically a section of power line from the last power substation to the endpoints it serves. A feeder may include hundreds of spans. The system can predict the risk of an adverse condition occurring on a particular feeder (e.g., without creating an intermediate database of plants and/or spans). Feature vectors from one or more of the various databases described above can be can be input (e.g., along with imagery) into a machine-learned vegetation overgrowth neural network to receive prediction(s) regarding the occurrence of a vegetative overgrowth condition at various plants, spans, feeders, and/or other objects.

According to another aspect, in some implementations of the present disclosure, one or more quantitative measures can be determined based on one or more images (e.g., one or more ground-level images and/or overhead images). The one or more quantitative measures can then be provided to a downstream model (e.g., a downstream condition prediction neural network included in the condition prediction model) for use in generating a prediction regarding the occurrence of the adverse condition. For example, the one or more quantitative measures can be input into the model along with one or more images. In one example, a time series of low-resolution overhead images can be mathematically collapsed into one or more quantitative measures (e.g., one measured value for each image). As an example, the quantitative measure can be a center-weighted measure of a percent of pixels that are green (or some other spectral signature) in a local neighborhood of a particular plant (e.g., within 30 meters). Such one or more quantitative measures can then be input into a downstream condition prediction neural network (e.g., along with the overhead images, one or more ground-level images, one or more object feature vectors, etc.) to receive at least one prediction regarding the occurrence of an adverse condition.

In some implementations, the one or more quantitative measures can describe one or more changes exhibited by a geographic area depicted by two or more input images. As one example, the quantitative measure can describe a rate of vegetative growth exhibited by a geographic area, as evidenced by two or more images of such geographic area captured at two or more different respective times. Thus, the quantitative measure input into the model can be a single value for each image or can describe a change in such measure from image to image. For example, the quantitative measure can describe the percent of pixels that are green for each image, or can describe a change in the percent of pixels that are green from image to image.

Thus, the present disclosure provides systems and methods that predict and prevent adverse conditions at structural assets. In particular, the systems and methods of the present disclosure leverage machine-learned models such as neural networks (e.g., deep neural networks) to predict existing and/or future instances of adverse conditions based on imagery that depicts the structural assets.

With reference now to the Figures, example embodiments of the present disclosure will be discussed in further detail.

Example Systems

FIG. 1 depicts an example computing system 100 to predict and prevent adverse conditions at structural assets according to example embodiments of the present disclosure. The system 100 includes a machine learning computing system 130 and an imagery platform 120 that are communicatively coupled over a network 180.

The imagery platform 120 can include an accessible image database 122 that stores imagery of geographic areas that contain structural assets. For example, the image database 122 can store ground-level images 124. As examples, the ground-level images can be street-level panoramic images, sets of light detection and ranging (LIDAR) data, user-submitted photographs, images collected by an image collection vehicle, or other imagery at or near the level of the ground. The image database 122 can also store overhead images 126. As examples, the overhead images can be images captured by satellites, images captured by aircraft (e.g., planes, drones, etc.), or other imagery taken from an overhead position. The images in database 122 (e.g., images 124 and/or 126) can be optical images, infrared images, LIDAR data images, hyperspectral images, or any other type of imagery.

Structural assets can include utility assets (e.g., utility poles, utility wires, transformers, etc.), building assets (e.g., residential homes, factories, office buildings, etc.), infrastructure (e.g., bridges, roads, etc.), industrial assets, or other structural assets.

The machine learning computing system 130 includes one or more processors 132 and a memory 134. The one or more processors 132 can be any suitable processing device (e.g., a processor core, a microprocessor, an ASIC, a FPGA, a controller, a microcontroller, etc.) and can be one processor or a plurality of processors that are operatively connected. The memory 134 can include one or more non-transitory computer-readable storage mediums, such as RAM, ROM, EEPROM, EPROM, flash memory devices, magnetic disks, etc., and combinations thereof. The memory 134 can store data 136 and instructions 138 which are executed by the processor 132 to cause the machine learning computing system 130 to perform operations.

In some implementations, the machine learning computing system 130 includes or is otherwise implemented by one or more server computing devices. In instances in which the machine learning computing system 130 includes plural server computing devices, such server computing devices can operate according to sequential computing architectures, parallel computing architectures, or some combination thereof.

The machine learning computing system 130 stores or otherwise includes one or more machine-learned condition prediction models 140. For example, the condition prediction models 140 can be or can otherwise include various machine-learned models such as neural networks (e.g., deep neural networks) or other multi-layer non-linear models.

According to an aspect of the present disclosure, the machine learning computing system 130 can access images from the imagery platform 120 that depict a first structural asset. The machine learning computing system 130 can use one or more condition prediction models 140 to make predictions regarding the present and/or future occurrence of one or more adverse conditions at the first structural asset based on the obtained images. For example, the machine learning computing system 130 can input the obtained images into one or more condition prediction models 140 to receive one or more predictions by the one or more models 140 regarding the occurrence of the one or more adverse conditions at the first structural asset.

In some implementations, the machine learning computing system 130 can further store or include an object feature database 142. The object feature database 142 can store data that describes various attributes of one or more objects in or surrounding the structural assets. In one example application, the object feature database 142 can be a plant database that contains information about the attributes of plants detected in geographic areas that contain utility assets.

In some implementations, information from the object feature database 142 (e.g., one or more object feature vectors) can be input (e.g., along with imagery) into a machine-learned model 140 to receive prediction(s) regarding the occurrence of an adverse condition at the structural asset and/or the object described by the input information from the object feature database 142.

In addition, in some implementations, the system 100 further includes a client computing device 102 communicatively coupled over the network 180. The client computing device 102 can be any type of computing device, such as, for example, a personal computing device (e.g., laptop or desktop), a mobile computing device (e.g., smartphone or tablet), a server computing device, or any other type of computing device. The client computing device 102 includes one or more processors 112 and a memory 114. The one or more processors 112 can be any suitable processing device (e.g., a processor core, a microprocessor, an ASIC, a FPGA, a controller, a microcontroller, etc.) and can be one processor or a plurality of processors that are operatively connected. The memory 114 can include one or more non-transitory computer-readable storage mediums, such as RAM, ROM, EEPROM, EPROM, flash memory devices, magnetic disks, etc., and combinations thereof. The memory 114 can store data 116 and instructions 118 which are executed by the processor 112 to cause the client computing device 102 to perform operations. For example, the instructions 118 can include instructions associated with a web browser application.

In some implementations, the client computing device 102 can receive user input or instructions that identify the first structural asset and/or the adverse condition. In response to receipt of the user input, the client computing device 102 can request or otherwise cause the machine learning computing system 130 to obtain imagery that depicts the first structural asset from the image database 122 and input the retrieved imagery into a condition prediction model 140 to obtain predictions regarding conditions at the first structural asset. In other implementations, the client computing device 102 can obtain the imagery from the imagery platform 120 and then provide it to the machine learning system 130. For example, the obtained imagery can be selected by the user of the client computing device 102 or can otherwise be identified based on user input. Thus, the client computing device 102 can make use of the machine learning platform 130 as a service for predictive purposes, which may in some instances be referred to as "machine learning as a service."

In some implementations, the system 100 further includes a training computing system 150 communicatively coupled over the network 180. The training computing system 150 can be separate from the machine learning computing system 130 or can be a portion of the machine learning computing system 130. The training computing system 150 includes one or more processors 152 and a memory 154. The one or more processors 152 can be any suitable processing device (e.g., a processor core, a microprocessor, an ASIC, a FPGA, a controller, a microcontroller, etc.) and can be one processor or a plurality of processors that are operatively connected. The memory 154 can include one or more non-transitory computer-readable storage mediums, such as RAM, ROM, EEPROM, EPROM, flash memory devices, magnetic disks, etc., and combinations thereof. The memory 154 can store data 156 and instructions 158 which are executed by the processor 152 to cause the training computing system 150 to perform operations. In some implementations, the training computing system 150 includes or is otherwise implemented by one or more server computing devices.

The training computing system 150 can include a model trainer 160 that trains the machine-learned models 140 stored at the machine learning computing system 130 using various training or learning techniques, such as, for example, backwards propagation. In particular, the model trainer 160 can train a condition prediction model 140 based on a set of training examples. In some implementations, the training examples can be provided or otherwise selected by the client computing device 102 (e.g., from the imagery platform 120).

In some implementations, the model trainer 160 can train the machine-learned model 140 using imagery that depicts known instances of an adverse condition. For example, known instances of the adverse condition can correspond to historical and/or expert-identified instances of actual harm or compliance violation. Further, as discussed above, in some implementations, the training data can include a time series of imagery depicting a location, each training example providing information sufficient to determine, for each image in the time series of imagery, an amount of time until a known instance of occurrence of the adverse condition at the location depicted by such image. Likewise, as discussed above, the training data can be labelled according to a number of different metrics, including fact of concern metrics (e.g., occurrence of the adverse condition) and/or magnitude of concern metrics (e.g., dollar cost or some other metric predicted to result from a predicted occurrence of the adverse condition).

The model trainer 160 includes computer logic utilized to provide desired functionality. The model trainer 160 can be implemented in hardware, firmware, and/or software controlling a general purpose processor. For example, in some implementations, the model trainer 160 includes program files stored on a storage device, loaded into a memory and executed by one or more processors. In other implementations, the model trainer 160 includes one or more sets of computer-executable instructions that are stored in a tangible computer-readable storage medium such as RAM hard disk or optical or magnetic media.

The network 180 can be any type of communications network, such as a local area network (e.g., intranet), wide area network (e.g., Internet), or some combination thereof and can include any number of wired or wireless links. In general, communication over the network 180 can be carried via any type of wired and/or wireless connection, using a wide variety of communication protocols (e.g., TCP/IP, HTTP, SMTP, FTP), encodings or formats (e.g., HTML, XML), and/or protection schemes (e.g., VPN, secure HTTP, SSL).

Thus, the imagery platform 120, the training computing system 150, and the machine learning computing system 130 may cooperatively operate to enable the user to select portions of imagery, instruct training of a model 140 based on the selected training imagery, select additional imagery, and then instruct use of the trained model 140 to receive predictions regarding structural assets depicted by the additionally selected imagery.

The user can use the predictions to better monitor and prevent the adverse conditions at the structural assets. For example, identified instances of adverse conditions can be resolved. Likewise, instances of adverse conditions that are predicted to occur in the near future can be resolved prior to occurrence, thereby reducing damage or compliance violations and associated costs.

In particular, as an example, the predictions can be used to assist in prioritizing maintenance tasks. For example, if an adverse condition is predicted to occur at a first structural asset prior to occurring at a second structural asset, then resources that are limited can be deployed to maintain or otherwise prevent the adverse condition at the first structural asset in favor of the second structural asset. As an example, predictions regarding instances of vegetative overgrowth conditions at utility assets can be used to generate or otherwise inform maintenance crew (e.g., tree trimmers) target areas and/or schedules. In addition, predictions can also be used to establish compliance and/or assess an aggregate overall risk (e.g., either generally or associated with specific scenarios such as, for example, severe storms).

Example Condition Prediction Models

Figure 2:
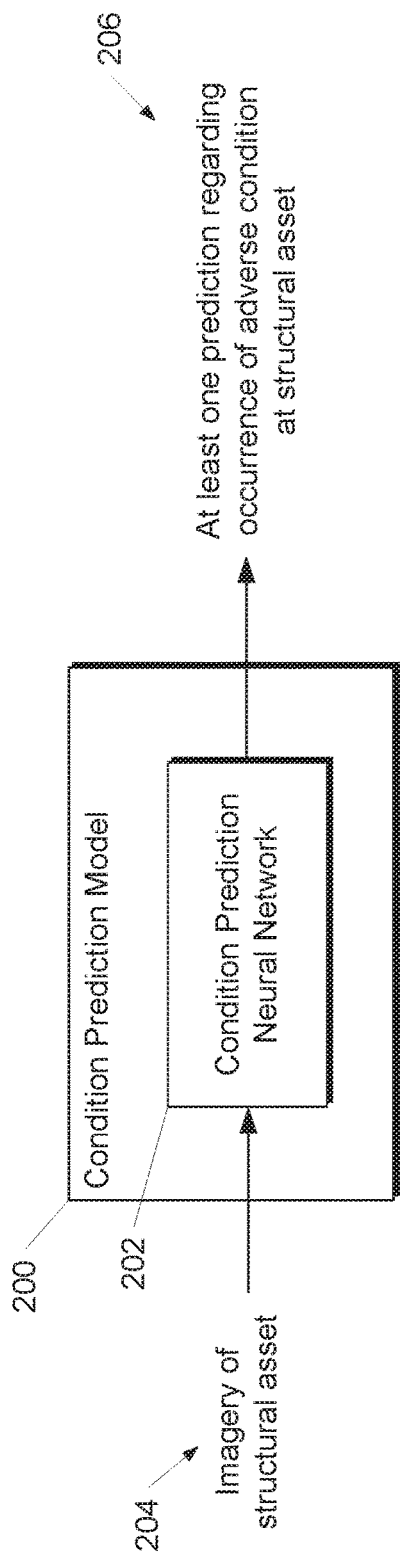
FIG. 2 depicts an example condition prediction model according to example embodiments of the present disclosure.

FIG. 2 depicts an example condition prediction model 200 according to example embodiments of the present disclosure. The condition prediction model 200 includes a condition prediction neural network 202. For example, the condition prediction neural network 202 can be a deep neural network. The condition prediction neural network 202 can receive as inputs imagery 204 of a structural asset. In response to the input imagery 204, the condition prediction neural network 202 can output at least one prediction 206 regarding the occurrence of an adverse condition at the structural asset depicted by the input imagery 204.

As an example, in some implementations, the prediction 206 output by the condition prediction model 200 can include a single prediction regarding the current existence of an adverse condition at the structural asset depicted by the input imagery 204. In some implementations, such single prediction can be accompanied by a confidence score that describes a confidence or probability that the input imagery depicts the current existence of the adverse condition.

As another example, in some implementations, the prediction 206 output by the condition prediction model 200 can include at least one prediction regarding the occurrence of the adverse condition at the structural asset during one or more future time periods. Thus, the condition prediction model 200 can predict not just a probability of the adverse condition currently existing, but can further predict the likelihood or probability of the adverse condition occurring during a number of future time periods. For example, in some implementations, the condition prediction model 200 can output a plurality of confidence scores that respectively describe a confidence that the adverse condition will respectively occur at the structural asset during the plurality of future time periods. Thus, for example, the condition prediction model 200 can provide a plurality of probabilities for respective instances of likely future encroachment over a plurality of specified future time periods.

As will be discussed further below, in some implementations in which the condition prediction model 200 provides predictions regarding the future occurrence of adverse conditions, the condition prediction model 200 can be trained on a set of training data that includes a plurality of training examples, where each training example includes a time series of imagery depicting a location and provides information sufficient to determine, for each image in the time series of imagery, an amount of time until a known instance of occurrence of the adverse condition at the location depicted by such image. Thus, for example, the condition prediction model 200 (e.g., the condition prediction neural network 202) can be trained on training examples that each include a series of images, where an amount of time until occurrence of the adverse condition is provided for each image in the series. Such training examples can enable the condition prediction model 200 (e.g., the condition prediction neural network 202) to learn to predict a time remaining until occurrence of adverse condition based on imagery that does not yet depict an adverse condition. However, images that do, in fact, depict the occurrence of the adverse condition can be included in the training set as well.

Furthermore, in some implementations in which the condition prediction model 200 is used to provide predictions regarding the future occurrence of adverse conditions, the imagery 204 that is input into the model 200 to receive predictions 206 can be accompanied by information sufficient to determine a time (e.g., date) at which each of such input images 204 were captured. As one example, one or more images 204 and one or more respective times at which such images 204 were respectively captured can be input into the condition prediction model 200. Inclusion of input information regarding the time of capture of images 204 can enable the condition prediction model 200 to more accurately and precisely predict when a projected future occurrence of the adverse condition may likely occur. In some implementations, the time of capture information may simply indicate an amount of time that elapsed between each respective pair of sequential images in a time-sequence of imagery and an amount of time that has elapsed since the most recent of such images (e.g., rather than specifying a particular objective time or date of capture).

As yet another example, in some implementations, the prediction 206 output by the condition prediction model 200 can include one or more predictions regarding a cost of the occurrence of an adverse condition that is predicted to occur during a current time period and/or one or more future time periods. Thus, in some implementations, the condition prediction model 200 can make predictions 206 regarding not only the fact of concern (e.g., that an adverse condition is about to occur), but can additionally and/or alternatively provide predictions 206 regarding a magnitude of concern, as measured by some metric. For example, the predictions 206 can include predictions expressed in terms of dollars; expressed in terms of one or more reliability indices for utilities, such as the Customer Average Interruption Duration Index (CAIDI), the System Average Interruption Duration Index (SAIDI), the System Average Interruption Frequency Index (SAIFI), the Customer Average Interruption Frequency Index (CAIFI), the Customer Interrupted per Interruption Index (CIII), the Momentary Average Interruption Frequency Index (MAIFI), and/or the Average Service Availability Index (ASAI); expressed in terms of Occupational Safety and Health Administration (OSHA) reportable instances; expressed in terms of regulatory compliance requirements/costs; and/or expressed in terms of any other metric, including, for example, a custom defined metric. One example custom defined metric can provide a dollar cost per minute outage or downtime of the structural asset (e.g., per minute at which the adverse condition exists).

Such predictions 206 that provide a magnitude of concern regarding the occurrence of the adverse condition can be provided for a current time period and/or one or more future time periods. Further, in various implementations, the condition prediction model 200 can predict a single cost (e.g., a single prediction regarding a direct cost metric such as dollars or other metric for each time period for which a prediction is provided) or can provide a plurality of probabilities that the cost (as expressed in some metric) of the adverse condition will fall into certain cost ranges (e.g., a "histogram of cost" for each predicted time period). Likewise, in instances in which the condition prediction model 200 provides such metric-based predictions 206, the model 200 can be trained on training data that includes examples of imagery labelled with known outcomes expressed according to the desired metric, for example, based on historical data regarding costs resulting from the adverse condition, as expressed in terms of the desired metric.

In one example application, the condition prediction model 200 can be used to predict and prevent instances of vegetative overgrowth on utility assets. In particular, high-resolution imagery (e.g., ground-level imagery such as photographic imagery, LIDAR data, or other imagery) can be collected that depicts vegetation in relevant geographic areas in which utility assets are located. As described above, the condition prediction model 200 can be trained to detect instances of existing encroachment and/or predict instances of likely future encroachment (e.g., over one or more specified future time periods). For example, the model 200 can be trained using images known to be associated with vegetative overgrowth (e.g., due to historical incident data and/or based on manual review of imagery by human experts).

In some instances, however, use of condition prediction model 200 to continuously monitor or otherwise frequently predict instances of adverse conditions can have very high requirements for input imagery 204. As an example, the user may desire or be required to monitor a significant number or volume of structural assets. For example, all of the infrastructure (such as poles, wiring, transformers, etc.) for a utility company may cover many miles of geography. As another example, the objects or other factors which cause the monitored adverse condition may be rapidly changing, at least relative to the rate at which new imagery is acquired or otherwise made available. For example, in the case of a vegetative overgrowth condition, trees or other plants may grow more quickly than high-resolution imagery of the corresponding geographic area is typically acquired.

Thus, in some instances, to continuously monitor or otherwise frequently predict instances of adverse conditions, the input imagery 204 must be both quite high-resolution (e.g., of sufficient resolution to usefully depict features of individual objects such as, for example, individual branches, leaves, and or shoots of trees or other plants) and quite frequent (e.g., of sufficient frequency to allow determination of the adverse condition according to an appropriate period at which conditions associated with the adverse condition change, such as, for the example of vegetative overgrowth, daily, weekly, and/or monthly periods).

However, the above discussed requirements of high-resolution and high frequency are typically not met by a single type of imagery. For example, traditional remote sensing via imagery is typically optimized for either resolution or frequency, but not both. As an example, ground-level imagery, such as, for example, LIDAR data is typically high-resolution, but is acquired at a relatively low frequency due to the cost of sending an imaging system to all locations to acquire the imagery. Likewise, overhead imagery, such as, for example, satellite or aircraft (e.g., airplane or drone) imagery can be acquired at a relatively higher frequency, but typically does not provide sufficient resolution to identify detailed features of individual structural assets or surrounding objects such as, for example, tree branches.

As such, according to an aspect of the present disclosure, frequent-but-lower-resolution imagery can be combined with infrequent-but-higher-resolution imagery. Such combination technique can result in improved system prediction performance and/or dramatic reductions in the cost of imagery collection. In particular, in some implementations, relatively higher-resolution ground-level images that are collected, for example, once every few years (and which may be of sufficient resolution to indicate more detailed conditions such as, for example, tree locations, orientations, sizes, species, or other attributes) can be combined with relatively lower-resolution overhead imagery that is collected, for example, monthly (and which may be of sufficient resolution to indicate less detailed conditions such as general rates of vegetation growth).

Figure 3:
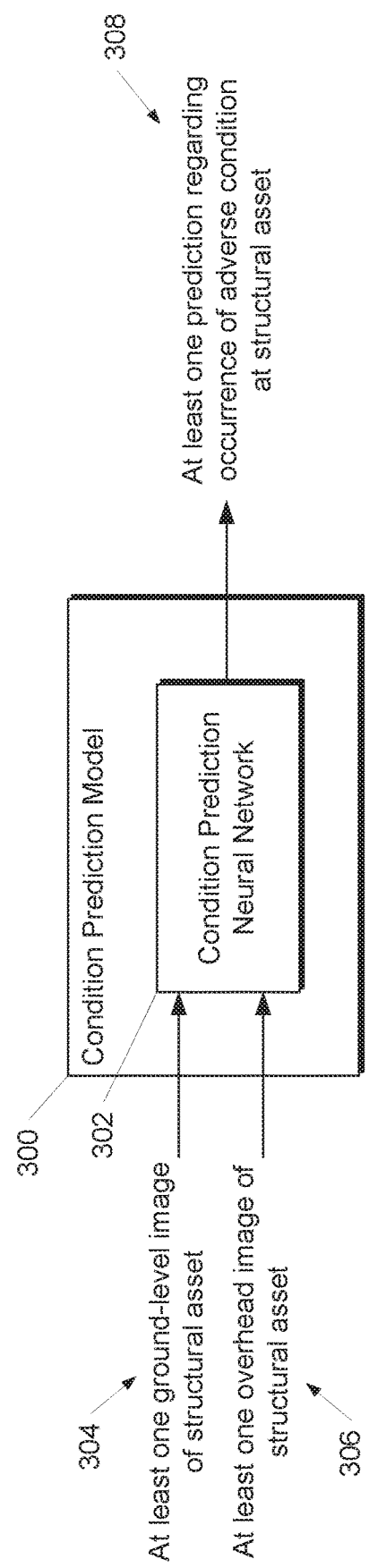
FIG. 3 depicts an example condition prediction model according to example embodiments of the present disclosure.

As one example, FIG. 3 depicts an example condition prediction model 300 according to example embodiments of the present disclosure. The condition prediction model 300 includes a condition prediction neural network 302. The model 300 and the neural network 302 can be the same as or similar to the model 200 and the neural network 202 of FIG. 2, respectively.

More particularly, as introduced above, the condition prediction model 300 can receive as inputs both at least one ground-level image 304 and at least one overhead image 306 that depict a structural asset. For example, the ground-level image 304 and the overhead image 306 can be concatenated into a single concatenated image that is input into the condition prediction model 300. For example, the images can be the most recent images of their respective type. In some instances, various types of image preprocessing such as, for example, cropping, cloud/fog/haze removal, centering, or other image processing techniques can be performed prior to concatenation and/or entry of the images 304 and 306 into the model 300. For example, either or both of the images 304 and 306 can be centered about a particular structural asset and/or object near to the structural asset that may influence an adverse condition at the structural asset (e.g., a particular tree that may cause a vegetative overgrowth condition).

In response to the input images 304 and 306, the condition prediction model 300 can output at least one prediction 308 regarding the occurrence of an adverse condition at the structural asset. For example, the prediction 308 can be in one or more of the forms described with reference to prediction 206 of FIG. 2.

Figure 4:
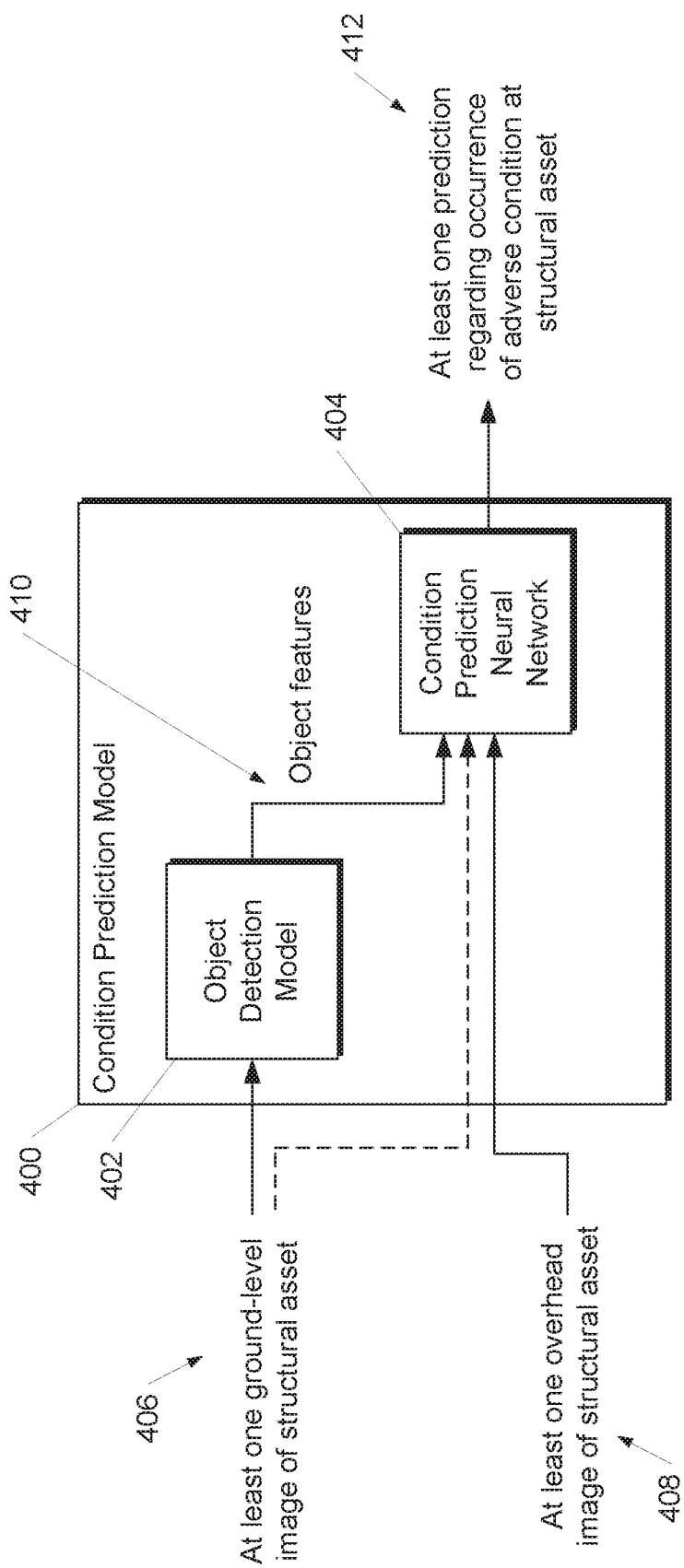
FIG. 4 depicts an example condition prediction model according to example embodiments of the present disclosure.

As another example model that receives both ground-level and overhead imagery, FIG. 4 depicts an example condition prediction model 400 that includes a machine-learned object detection model 402. The object detection model 402 can receive one or more input images (e.g., at least one ground-level image 406 as illustrated in FIG. 4) and, in response to the input images 406, detect one or more individual objects depicted by the images. In particular, the object detection model 402 can output one or more object feature vectors 410 that respectively describe one or more attributes of one or more respective objects included in a geographic area depicted by the input imagery 406. As an example, the object detection model 402 can be a neural network, such as a deep neural network.

The one or more of the object feature vectors 410 (or other object attribute data representations) can then be provided to a downstream condition prediction neural network 404 included in the condition prediction model 400 for use in generating a prediction 412 regarding the occurrence of the adverse condition. For example, the object feature vectors 410 can be generated from the one or more ground-level images 406 and can then be input into the condition prediction neural network 404 along with one or more overhead images 408. The one or more ground-level images 406 can optionally be input as well (e.g., as shown by the dotted line in FIG. 4). In some implementations, the one or more overhead images 408 and/or the one or more ground-level images 406 input along with the object feature vector(s) 410 can be centered about a particular object described by the input object feature vector(s) 410. The condition prediction neural network 404 can be the same as or similar to the neural networks 202 and 302 of FIGS. 2 and 3. The prediction 412 can be in one or more of the forms discussed with reference to FIG. 2.

In some implementations, in addition or alternatively to input of the object feature vectors 402 into the downstream condition prediction neural network 404, the object feature vectors 410 can be used to build or supplement an object feature database that contains information about various attributes of objects in geographic areas surrounding structural assets to be monitored.

In one example application of the principles described above, the object detection model can be a plant detection model that receives input imagery (e.g., ground-level image(s)) and outputs one or more plant feature vectors that respectively describe attributes (e.g., locations, orientations, sizes, species, or other attributes) of one or more plants such as trees that are depicted by the imagery. In particular, the plant feature vectors can be used to build a plant database that contains information about the attributes of plants detected in geographic areas that contain utility assets. Information from the plant database (e.g., one or more plant feature vectors) can be input (e.g., along with imagery) into a machine-learned vegetation overgrowth neural network to receive prediction(s) regarding the occurrence of a vegetative overgrowth condition at the plants described by the input feature vectors.

Figure 5:
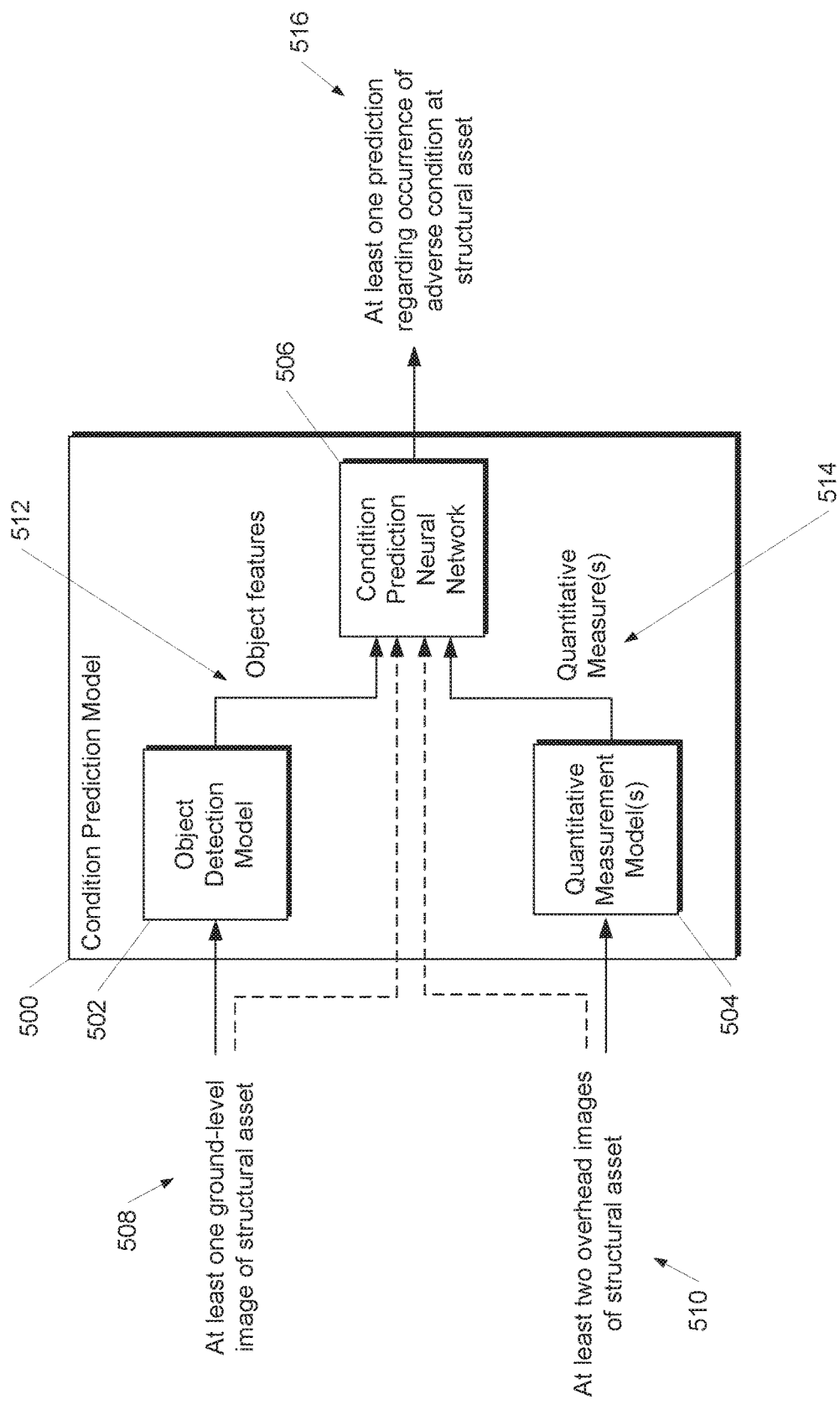
FIG. 5 depicts an example condition prediction model according to example embodiments of the present disclosure.

As another example model that receives both ground-level and overhead imagery, FIG. 5 depicts an example condition prediction model 500 that includes one or more quantitative measurement models 504. The quantitative measurement model(s) 504 can determine one or more quantitative measures 514 based on one or more images (e.g., two or more overhead images 510, as illustrated in FIG. 5). The one or more quantitative measures 514 can then be provided to a downstream condition prediction neural network 506 included in the condition prediction model 500 for use in generating a prediction 516 regarding the occurrence of the adverse condition. For example, the one or more quantitative measures 514 can be input into the neural network 506 along with one or more images (e.g., the overhead images 510 and/or one or more ground-level images 508). In addition, in some implementations, the quantitative measures 514 can be input into the neural network 506 along with one or more object feature vectors 512 that were output by an object detection model 502 based on received imagery (e.g., ground-level image(s) 508). In other implementations, the condition prediction model 500 does not include or otherwise can be used without the object detection model 502.

In one example, a time series of low-resolution overhead images 510 can be mathematically collapsed into one or more quantitative measures 514 (e.g., one measured value for each image). As an example, the quantitative measure 514 can be a center-weighted measure of a percent of pixels that are green (or some other spectral signature) in a local neighborhood of a particular plant (e.g., within 30 meters). The one or more quantitative measures 514 can then be input into the downstream condition prediction neural network 506 (e.g., along with the overhead images 510, one or more ground-level images 508, and/or one or more object feature vectors 512) to receive at least one prediction 516 regarding the occurrence of an adverse condition. The at least one prediction 516 can be in one or more of the forms discussed with reference to FIG. 2.

In some implementations, the one or more quantitative measures 514 can describe one or more changes exhibited by a geographic area depicted by two or more input images. As one example, the quantitative measure 514 can describe a rate of vegetative growth exhibited by a geographic area, as evidenced by two or more images of such geographic area captured at two or more different respective times. Thus, the quantitative measure 514 input into the neural network 506 can be a single value for each image 510 or can describe a change in such measure from image to image. For example, the quantitative measure 514 can describe the percent of pixels that are green for each image, or can describe a change in the percent of pixels that are green from image to image.

Thus, the present disclosure provides systems and methods that predict and prevent adverse conditions at structural assets. In particular, the systems and methods of the present disclosure leverage machine-learned models such as neural networks (e.g., deep neural networks) to predict existing and/or future instances of adverse conditions based on imagery that depicts the structural assets.

Example Methods

Figure 6:
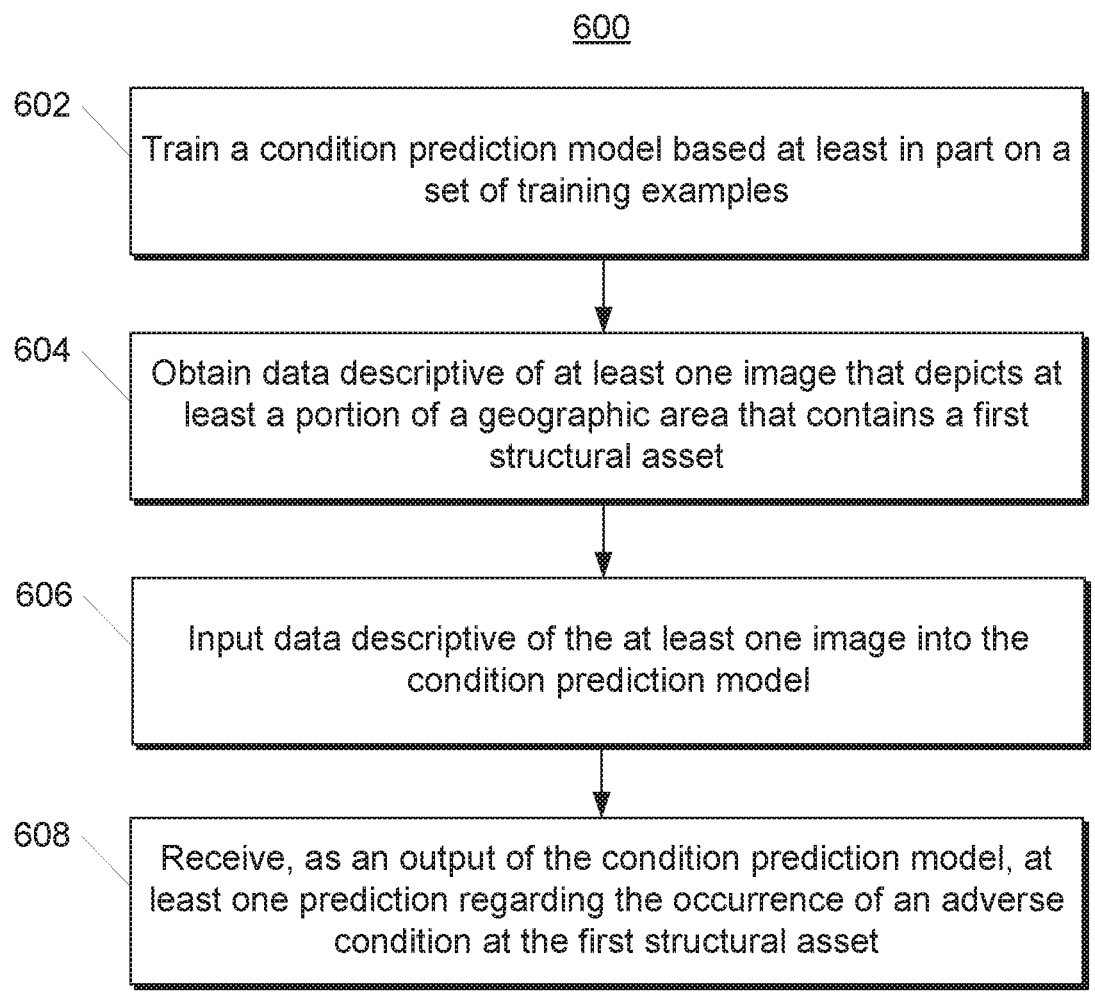
FIG. 6 depicts an example method to predict and prevent adverse conditions at structural assets according to example embodiments of the present disclosure.

FIG. 6 depicts an example method 600 to predict and prevent adverse conditions at structural assets according to example embodiments of the present disclosure.

At 602, a computing system trains a condition prediction model based at least in part on a set of training examples.

As an example, in some implementations, each of the set of training examples includes a time series of imagery depicting a location. In some implementations, each training example provides information sufficient to determine, for each image in the time series of imagery, an amount of time until a known instance of occurrence of the adverse condition at the location depicted by such image.

At 604, the computing system obtains data descriptive of at least one image that depicts at least a portion of a geographic area that contains a first structural asset.

As one example, in some implementations, at 604, the computing system obtains a plurality of images that depict the geographic area. The plurality of images can include a first image and a second image that depict the geographic area, where the first image and the second image are different from each other in at least one of the following attributes: time of capture, location of capture, angle of capture, data type, and resolution. For example, in some implementations, the first image is a first ground-level image and the second image is a first overhead image. As examples, the first ground-level image can be a first set of LIDAR data or can be a first ground-level panoramic image.

As another example, in some implementations, the plurality of images can respectively depict the geographic area at a plurality of different times. For example, the plurality of images can include a first image captured a first time and a second image captured at a second time that is different than the first time.

In some implementations, the plurality of images obtained at 604 includes a plurality of ground-level images. For example, the plurality of images can include a third image, where the third image is a second overhead image of the geographic area that contains the first structural asset. In some implementations, the third image was captured at a third time that is different than the second time.

At 606, the computing system inputs the data descriptive of the at least one image obtained at 604 into the condition prediction model. The condition prediction model can include at least one neural network.

As one example, in some implementations, inputting the data into the condition prediction model at 606 can include inputting data descriptive of at least the first image, the first time at which the first image was captured, the second image, and the second time at which the second image was captured into the condition prediction model. In some implementations, at 606, the computing system inputs data descriptive of at least the first image, the first time, the second image, the second time, the third image, and the third time into the condition prediction model.

As another example, in some implementations, inputting the data into the condition prediction model at 606 can include inputting one or more ground-level images into an object detection model of the condition prediction model and receiving, as an output of the object detection model, one or more object feature vectors that respectively describe attributes of one or more objects contained in the geographic area. In some such implementations, the method 600 may further include an additional step in which the computing system builds an object database that contains a plurality of object feature vectors that respectively describe attributes of a plurality of objects contained in the geographic area. In addition, in some of such implementations, inputting the data into the condition prediction model at 606 can include inputting data descriptive of the one or more object feature vectors, the first time, the first overhead image, and the second time into a condition prediction neural network of the condition prediction model.

As yet another example, in some implementations, inputting the data into the condition prediction model at 606 can include determining one or more quantitative measures based at least in part on the first overhead image and the second overhead image. In some implementations, the one or more quantitative measures are respectively descriptive of one or more changes exhibited by the geographic area between the second time and the third time respectively associated with the first overhead image and the second overhead image. In some of such implementations, inputting the data into the condition prediction model at 606 can further include inputting data descriptive of at least the first image, the first time, the one or more quantitative measures, the second time, and the third time into a condition prediction neural network of the condition prediction model.

At 608, the computing system receives, as an output of the condition prediction model, at least one prediction regarding the occurrence of an adverse condition at the first structural asset.

As an example, in some implementations, receiving the at least one prediction at 608 can include receiving, as an output of the condition prediction model, at least one prediction regarding the occurrence of an adverse condition at the first structural asset during one or more future time periods. As another example, in some implementations, receiving the at least one prediction at 608 can include receiving, as the output of the condition prediction model, a plurality of confidence scores that respectively describe a confidence of the adverse condition respectively occurring at the first structural asset during a plurality of future time periods.

In addition, in some implementations, the method 600 can include an additional step in which the computing system generates a maintenance schedule for the first structural asset based at least in part on at the least prediction received at 608.

Figure 7:
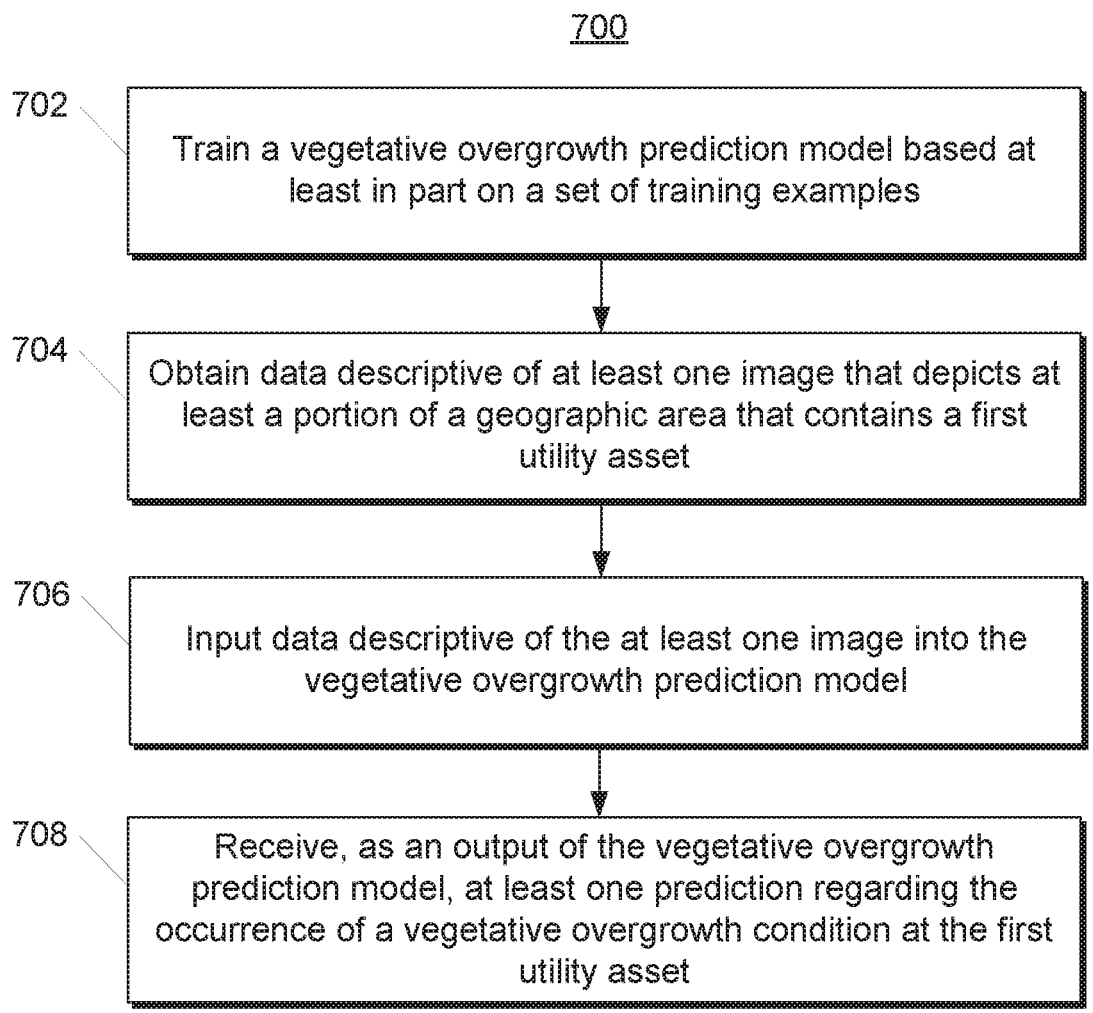
FIG. 7 depicts an example method to predict and prevent instances of vegetative overgrowth on utility infrastructure according to example embodiments of the present disclosure.

FIG. 7 depicts an example method 700 to predict and prevent instances of vegetative overgrowth on utility infrastructure according to example embodiments of the present disclosure.

At 702, a computing system trains a vegetative overgrowth prediction model based at least in part on a set of training examples.

As an example, in some implementations, each of the set of training examples includes a time series of imagery depicting a location. In some implementations, each training example provides information sufficient to determine, for each image in the time series of imagery, an amount of time until a known instance of occurrence of a vegetative overgrowth condition at the location depicted by such image.

At 704, the computing system obtains data descriptive of at least one image that depicts at least a portion of a geographic area that contains a first utility asset.

As one example, in some implementations, at 704, the computing system obtains a plurality of images that depict the geographic area. The plurality of images can include a first image and a second image that depict the geographic area, where the first image and the second image are different from each other in at least one of the following attributes: time of capture, location of capture, angle of capture, data type, and resolution. For example, in some implementations, the first image is a first ground-level image and the second image is a first overhead image. As examples, the first ground-level image can be a first set of LIDAR data or can be a first ground-level panoramic image.

As another example, in some implementations, the plurality of images can respectively depict the geographic area at a plurality of different times. For example, the plurality of images can include a first image captured a first time and a second image captured at a second time that is different than the first time.

In some implementations, the plurality of images obtained at 704 includes a plurality of ground-level images. For example, the plurality of images can include a third image, where the third image is a second overhead image of the geographic area that contains the first utility asset. In some implementations, the third image was captured at a third time that is different than the second time.

At 706, the computing system inputs the data descriptive of the at least one image into the vegetative overgrowth prediction model. The vegetative overgrowth prediction model can include at least one neural network.

As one example, in some implementations, inputting the data into the vegetative overgrowth prediction model at 706 can include inputting data descriptive of at least the first image, the first time at which the first image was captured, the second image, and the second time at which the second image was captured into the vegetative overgrowth prediction model. In some implementations, at 706, the computing system inputs data descriptive of at least the first image, the first time, the second image, the second time, the third image, and the third time into the vegetative overgrowth prediction model.

As another example, in some implementations, inputting the data into the vegetative overgrowth prediction model at 706 can include inputting one or more ground-level images into a plant detection model of the vegetative overgrowth prediction model and receiving, as an output of the plant detection model, one or more plant feature vectors that respectively describe attributes of one or more plants contained in the geographic area. In some such implementations, the method 700 may further include an additional step in which the computing system builds a plant database that contains a plurality of plant feature vectors that respectively describe attributes of a plurality of plants contained in the geographic area. In addition, in some of such implementations, inputting the data into the vegetative overgrowth prediction model at 706 can include inputting data descriptive of the one or more plant feature vectors, the first time, the first overhead image, and the second time into a vegetative overgrowth prediction neural network of the vegetative overgrowth prediction model.

As yet another example, in some implementations, inputting the data into the vegetative overgrowth prediction model at 706 can include determining one or more quantitative measures based at least in part on the first overhead image and the second overhead image. In some implementations, the one or more quantitative measures are respectively descriptive of one or more changes exhibited by the geographic area between the second time and the third time respectively associated with the first overhead image and the second overhead image. In some of such implementations, inputting the data into the vegetative overgrowth prediction model at 706 can further include inputting data descriptive of at least the first image, the first time, the one or more quantitative measures, the second time, and the third time into a vegetative overgrowth prediction neural network of the vegetative overgrowth prediction model.

At 708, the computing system receives, as an output of the vegetative overgrowth prediction model, at least one prediction regarding the occurrence of a vegetative overgrowth condition at the first utility asset.

As an example, in some implementations, receiving the at least one prediction at 708 can include receiving, as an output of the vegetative overgrowth prediction model, at least one prediction regarding the occurrence of a vegetative overgrowth condition at the first utility asset during one or more future time periods. As another example, in some implementations, receiving the at least one prediction at 708 can include receiving, as the output of the vegetative overgrowth prediction model, a plurality of confidence scores that respectively describe a confidence of the vegetative overgrowth condition respectively occurring at the first utility asset during a plurality of future time periods.

In addition, in some implementations, the method 700 can include an additional step in which the computing system generates a maintenance schedule for the first utility asset based at least in part on at the least prediction received at 708.

Additional Disclosure

The technology discussed herein makes reference to servers, databases, software applications, and other computer-based systems, as well as actions taken and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

In particular, although FIGS. 6 and 7 respectively depict steps performed in a particular order for purposes of illustration and discussion, the methods of the present disclosure are not limited to the particularly illustrated order or arrangement. The various steps of the methods 600 and 700 can be omitted, rearranged, combined, and/or adapted in various ways without deviating from the scope of the present disclosure.

What is claimed is:

1. A computing system to predict and prevent instances of vegetative overgrowth on utility infrastructure, the computing system comprising:
   at least one processor; and
   at least one tangible, non-transitory computer-readable medium that stores instructions that, when executed by the at least one processor, cause the computing system to:
      obtain data descriptive of a plurality of images that depict at least a portion of a geographic area that contains a first utility asset, the plurality of images comprising at least a first image and a second image, the first image and the second image being different from each other in at least one of the following attributes: time of capture, location of capture, angle of capture, data type, and resolution;
      input data descriptive of at least the first image and the second image into a machine-learned vegetation overgrowth prediction model that comprises a machine-learned object detection model and a machine-learned vegetation overgrowth neural network;
      receive, as an output of the machine-learned object detection model, one or more object feature vectors that respectively describe one or more attributes of one or more objects included in the geographic area;
      input the one or more object feature vectors and at least one of the plurality of images into the machine-learned vegetation overgrowth neural network; and
      receive, as an output of the machine-learned vegetation overgrowth neural network, at least one prediction regarding the occurrence of a vegetative overgrowth condition at the first utility asset during one or more future time periods, the at least one prediction produced by the machine-learned vegetation overgrowth neural network based at least in part on the one or more object feature vectors and the at least one of the plurality of images.

2. The computing system of claim 1, wherein:
the first image comprises a first ground-level image;
the second image comprises a first overhead image; and
the first ground-level image is of a relatively higher resolution than the first overhead image.

3. The computing system of claim 2, wherein:
the plurality of images comprise a plurality of ground-level images; and
execution of the instructions further causes the computing system to:
   analyze the plurality of ground-level images to build a plant database that contains a plurality of plant feature vectors that respectively describe attributes of a plurality of plants contained in the geographic area; and
   input at least one of the plurality of plant feature vectors into the machine-learned vegetation overgrowth prediction model along with at least one of the first image and the second image.

4. The computing system of claim 1, wherein execution of the instructions further causes the computing system to:
   generate a maintenance schedule for the first utility asset based at least in part on the at least one prediction regarding the occurrence of the vegetative overgrowth condition at the first utility asset during the one or more future time periods.

5. A computer-implemented method to predict and prevent adverse conditions at structural assets, the method comprising:
   obtaining, by one or more computing devices, data descriptive of a plurality of images that depict at least a portion of a geographic area that contains a first structural asset, wherein the plurality of images respectively depict the geographic area at a plurality of different times, the plurality of images comprising at least a first image captured at a first time and a second image captured at a second time that is different than the first time;
   inputting, by the one or more computing devices, data descriptive of at least the first image, the first time, the second image, and the second time into a condition prediction model, the condition prediction model comprising a machine-learned object detection model and a machine-learned condition prediction neural network;

receiving, as an output of the machine-learned object detection model, one or more object feature vectors that respectively describe one or more attributes of one or more objects included in the geographic area;

inputting the one or more object feature vectors and at least one of the plurality of images into the machine-learned condition prediction neural network; and receiving, by the one or more computing devices as an output of the machine-learned condition prediction neural network, at least one prediction regarding the occurrence of an adverse condition at the first structural asset during one or more future time periods, the at least one prediction produced by the machine-learned condition prediction neural network based at least in part on the one or more object feature vectors and the at least one of the plurality of images.

6. The computer-implemented method of claim 5, wherein obtaining, by the one or more computing devices, the data descriptive of the plurality of images comprises:

obtaining, by the one or more computing devices, the first image that comprises a first ground-level image of the geographic area that contains first structural asset; and obtaining, by the one or more computing devices, the second image that comprises a first overhead image of the geographic area that contains the first structural asset.

7. The computer-implemented method of claim 6, wherein obtaining, by the one or more computing devices, the first ground-level image comprises obtaining, by the one or more computing devices, a first set of light detection and ranging (LIDAR) data that corresponds to the first ground-level image of the first structural asset.

8. The computer-implemented method of claim 6, wherein inputting, by the one or more computing devices, the data descriptive of at least the first image, the first time, the second image, and the second time into the condition prediction model comprises:

inputting, by the one or more computing devices, the first ground-level image into the machine-learned object detection model;

and inputting, by the one or more computing devices, data descriptive of the first time, the first overhead image, and the second time into the machine-learned condition prediction neural network of the condition prediction model alongside the one or more object feature vectors.

9. The computer-implemented method of claim 8, wherein:

inputting, by the one or more computing devices, the first ground-level image into the machine-learned object detection model comprises inputting, by the one or more computing devices, the first ground-level image into a plant detection model;

receiving, by the one or more computing devices, the one or more object feature vectors comprises receiving, by the one or more computing devices as an output of the plant detection model, one or more plant feature vectors that respectively describe one or more attributes of one or more respective plants included in the geographic area that contains the first structural asset and depicted by the first ground-level image, wherein the one or more plants influence the occurrence of a vegetation overgrowth condition at the first structural asset;

inputting, by the one or more computing devices, the data into the condition prediction neural network comprises inputting, by the one or more computing devices, data descriptive of at least the one or more plant feature vectors, the first time, the first overhead image, and the second time into a vegetative overgrowth prediction neural network; and receiving, by the one or more computing devices as the output of the condition prediction model, the at least one prediction comprises receiving, by the one or more computing devices as the output of the vegetative overgrowth prediction neural network, the at least one prediction regarding the occurrence of the vegetative overgrowth condition at the first structural asset during the one or more future time periods.

10. The computer-implemented method of claim 6, wherein:

obtaining, by the one or more computing devices, the data descriptive of the plurality of images further comprises obtaining, by the one or more computing devices, a third image that comprises a second overhead image of the geographic area that contains the first structural asset, the third image captured at a third time that is different than the second time; and inputting, by the one or more computing devices, the data into the condition prediction model comprises inputting, by the one or more computing devices, the data descriptive of at least the first image, the first time, the second image, the second time, the third image, and the third time into the condition prediction model.

11. The computer-implemented method of claim 10, wherein inputting, by the one or more computing devices, the data descriptive of at least the first image, the first time, the second image, the second time, the third image, and the third time into the condition prediction model comprises:

determining, by the one or more computing devices, one or more quantitative measures based at least in part on the first overhead image and the second overhead image, the one or more quantitative measures respectively descriptive of one or more changes exhibited by the geographic area between the second time and the third time; and inputting, by the one or more computing devices, data descriptive of at least the first image, the first time, the one or more quantitative measures, the second time, and the third time into a condition prediction neural network of the condition prediction model.

12. The computer-implemented method of claim 11, wherein determining, by the one or more computing devices, the one or more quantitative measures comprises determining, by the one or more computing devices, the one or more quantitative measures respectively descriptive of a rate of vegetative growth exhibited by the geographic area between the second time and the third time.

13. The computer-implemented method of claim 5, further comprising:

prior to inputting the data into the condition prediction model, training, by the one or more computing devices the condition prediction model based at least in part on a set of training data that includes a plurality of training examples, each training example comprising a time series of imagery depicting a location, each training example providing information sufficient to determine, for each image in the time series of imagery, an amount of time until a known instance of occurrence of the adverse condition at the location depicted by such image.

14. The computer-implemented method of claim 5, wherein receiving, by the one or more computing devices as the output of the machine-learned condition prediction neural network, the at least one prediction regarding the occurrence of the adverse condition at the first structural asset during the one or more future time periods comprises receiving, by the one or more computing devices as the output of the machine-learned condition prediction neural network, a plurality of confidence scores that respectively describe a confidence of the adverse condition respectively occurring at the first structural asset during a plurality of future time periods.

15. The computer-implemented method of claim 5, wherein:
obtaining, by the one or more computing devices, the data descriptive of the plurality of images comprises obtaining, by the one or more computing devices, the data descriptive of the plurality of images that depict vegetative growth around a first utility asset at the plurality of different times;
inputting, by the one or more computing devices, the data descriptive of at least the first image, the first time, the second image, and the second time into the condition prediction model comprises inputting, by the one or more computing devices, the data descriptive of at least the first image, the first time, the second image, and the second time into a vegetative overgrowth prediction model that includes the at least one neural network; and
receiving, by the one or more computing devices as the output of the condition prediction model, the at least one prediction comprises receiving, by the one or more computing devices as the output of the vegetative overgrowth prediction model, the at least one prediction regarding the occurrence of a vegetative overgrowth condition at the first utility asset during the one or more future time periods.

16. A system to predict and prevent adverse conditions at structural assets, the system comprising:
an image database that stores a plurality of images of geographic areas, wherein the plurality of images comprise at least a first ground-level image that depicts at least a portion of a first geographic area that contains a first structural asset, and wherein the plurality of images further comprise at least a first overhead image that depicts at least a portion of the first geographic area that contains the first structural asset; and
a machine learning computing system, wherein the machine learning computing system comprises at least one processor and at least one memory that stores a condition prediction model usable to predict the occurrence of adverse conditions at structural assets during one or more future time periods based on input imagery, wherein the condition prediction model comprises a machine-learned object detection model and a machine-learned condition prediction neural network, and wherein the machine learning computing system is operable to:

obtain the first ground-level image of the first geographic area;
obtain the first overhead image of the first geographic area;
input data descriptive of at least the first ground-level image into the machine-learned objection detection model;
receive, as an output of the machine-learned object detection model, one or more object feature vectors that respectively describe one or more attributes of one or more objects included in the first geographic area;
input the one or more object feature vectors and the first overhead image into the machine-learned condition prediction neural network; and
receive at least one prediction regarding the occurrence of an adverse condition at the first structural asset as an output of the machine-learned condition prediction neural network, the at least one prediction produced by the machine-learned condition prediction neural network based at least in part on the one or more object feature vectors and the first overhead image.

17. The system of claim 16, wherein the first ground-level image comprises at least one of a first ground-level panoramic image and a first set of light detection and ranging (LIDAR) data.

18. The system of claim 16, wherein:
the machine-learned object detection model comprises a plant detection model;
the one or more object feature vectors comprise one or more plant feature vectors that respectively describe one or more attributes of one or more respective plants included in the first geographic area that contains the first structural asset and depicted by the first ground-level image, wherein the one or more plants influence the occurrence of a vegetation overgrowth condition at the first structural asset; and
the at least one prediction comprises at least one prediction regarding the occurrence of a vegetative overgrowth condition at the first structural asset.

19. The system of claim 16, further comprising a client computing system, wherein the client computing system comprises at least one processor and at least one memory, and wherein the client computing system is operable to:
receive user input that identifies at least one of the first geographic area and the first structural asset; and
in response to receipt of the user input, cause the machine learning computing system to obtain at least the first ground-level image and the first overhead image from the image database and input at least the first ground-level image and the first overhead image into the condition prediction model.

* * * * *